(12) United States Patent
Lenigk et al.

(10) Patent No.: US 10,033,910 B2
(45) Date of Patent: Jul. 24, 2018

(54) SYNCHRONOUS SAMPLING METHODS FOR INFRARED CAMERAS

(71) Applicant: General Electric Company, Schenectady, NY (US)

(72) Inventors: Ralf Lenigk, Schenectady, NY (US); Mark Marshall Meyers, Mechanicville, NY (US); Victor Petrovich Ostroverkhov, Ballston Lake, NY (US); Timothy Toepfer, Schenectady, NY (US); Keith Michael Looney, Glenmont, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 285 days.

(21) Appl. No.: 15/130,401

(22) Filed: Apr. 15, 2016

(65) Prior Publication Data
US 2017/0302826 A1 Oct. 19, 2017

(51) Int. Cl.
| | |
|---|---|
| *H04N 5/04* | (2006.01) |
| *G01J 5/10* | (2006.01) |
| *G01J 5/08* | (2006.01) |
| *G01J 3/28* | (2006.01) |
| *H04N 5/33* | (2006.01) |
| *G01J 5/00* | (2006.01) |

(52) U.S. Cl.
CPC ............. *H04N 5/04* (2013.01); *G01J 3/2823* (2013.01); *G01J 5/0896* (2013.01); *G01J 5/10* (2013.01); *H04N 5/33* (2013.01); *G01J 2005/0077* (2013.01)

(58) Field of Classification Search
CPC . H04N 5/04; H04N 5/33; G01J 5/0896; G01J 5/10; G01J 3/2823; G01J 2005/0077
See application file for complete search history.

(56) References Cited

U.S. PATENT DOCUMENTS

| | | | |
|---|---|---|---|
| 5,521,516 A * | 5/1996 | Hanagama | G01R 31/307 250/305 |
| 7,709,794 B2 | 5/2010 | Zhao et al. | |
| 9,007,466 B2 | 4/2015 | Knight et al. | |
| 9,091,755 B2 | 7/2015 | Kroepfl et al. | |
| 2007/0076786 A1* | 4/2007 | Shanmugam | G01S 19/24 375/148 |
| 2009/0292220 A1* | 11/2009 | Miyake | A61B 5/0816 600/534 |
| 2010/0074515 A1* | 3/2010 | Zhao | G01N 25/72 382/149 |
| 2011/0279683 A1 | 11/2011 | Yarmchuk et al. | |

(Continued)

FOREIGN PATENT DOCUMENTS

| | | |
|---|---|---|
| CN | 103607528 A | 2/2014 |
| CN | 203563151 U | 4/2014 |

*Primary Examiner* — Joseph Suh
(74) *Attorney, Agent, or Firm* — GE Global Patent Operation; John Darling

(57) ABSTRACT

The present approach relates to the synchronization of frame acquisition by a camera with an external event or trigger despite the camera lacking external control or synchronization capabilities. For example, inexpensive and/or consumer grade camera typically lack a control interface to explicitly synchronize with an external trigger event or external device. The present approach allows synchronization of such a camera lacking external synchronization capabilities with an external event or device.

17 Claims, 4 Drawing Sheets

(56) References Cited

U.S. PATENT DOCUMENTS

| | | |
|---|---|---|
| 2012/0062751 A1 | 3/2012 | Homma et al. |
| 2013/0169809 A1* | 7/2013 | Grignan ............... B63C 9/0005 348/148 |
| 2014/0346360 A1 | 11/2014 | Altmann et al. |
| 2015/0042820 A1* | 2/2015 | Weida ............... G01N 33/0047 348/165 |
| 2015/0193917 A1* | 7/2015 | Schachter ............... H04N 5/33 348/113 |
| 2015/0339830 A1 | 11/2015 | Heissenstein et al. |
| 2016/0216260 A1* | 7/2016 | Horning ............... G01N 33/558 |
| 2016/0225165 A1* | 8/2016 | Russell ............... G01N 21/8483 |
| 2017/0102321 A1* | 4/2017 | Mizuguchi ............. G01N 21/27 |
| 2017/0112396 A1* | 4/2017 | Pfeiffer .............. A61B 5/02125 |
| 2017/0131760 A1* | 5/2017 | Xie ....................... H04N 5/2257 |
| 2017/0264807 A1* | 9/2017 | Bonden ................ H04N 5/2354 |
| 2017/0276728 A1* | 9/2017 | Jenkins .............. G01R 31/3183 |

* cited by examiner

SYNCHRONOUS SAMPLING METHODS FOR INFRARED CAMERAS

BACKGROUND

The subject matter disclosed herein relates to the use of infrared cameras to capture precisely timed images in response to a triggering event external to the camera.

Inexpensive, consumer-grade infrared (IR)-cameras typically lack external control capabilities that would allow synchronization with external events of short duration (e.g., in the millisecond or microsecond range). As a result, infrared measurement and analysis equipment requiring precise synchronization with an external trigger event in the millisecond (or faster domain) conventionally utilizes more expensive hardware (i.e., IR cameras) that is specialized in nature, such as designed for laboratory use. Such special purpose cameras may be an order of magnitude more expensive than typical commercial or off-the-shelf type IR cameras. Suitable techniques for using consumer-grade IR cameras capable of being triggered in response to external events in a precisely timed manner is therefore desirable.

BRIEF DESCRIPTION

In one implementation, a method is provided for synchronizing image frame acquisition with an external event. In accordance with this method, image frames of one or more samples are acquired at a constant frame rate using an infrared (IR) camera. The IR camera is not configured to acquire frames in response to activation of an external device. Using a clock external to the IR camera, the constant frame rate and an acquisition time (time stamp) of each frame is determined. Based on the constant frame rate and the acquisition times, timing of future frame acquisitions is determined. The external device is activated based at least in part on the determined timing of future frame acquisitions.

In a further implementation, an image acquisition system is provided. In accordance with this implementation, the image acquisition system includes at least: an infrared (IR) camera, wherein the IR camera is configured to acquire image frames of one or more samples at a constant frame rate; a frame reader configured to acquire the image frames from the IR camera and to use a clock external to the IR camera to determine the constant frame rate and the acquisition time of each frame; and an external device configured to be activated based at least in part on timing of future frame acquisitions as determined from the constant frame rate and the acquisition time of each frame.

In an additional implementation, a method is provided of performing a photothermal spectroscopy assay. In accordance with this method, image frames of one or more samples are acquired at a constant frame rate using an infrared (IR) camera. The IR camera is not configured to acquire frames in response to activation of a laser used to illuminate the samples. Using a clock external to the IR camera, the constant frame rate and an acquisition time of each frame is determined. Based on the constant frame rate and the acquisition times, timing of future frame acquisitions is determined. The laser is activated based at least in part on the determined timing of future frame acquisitions.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
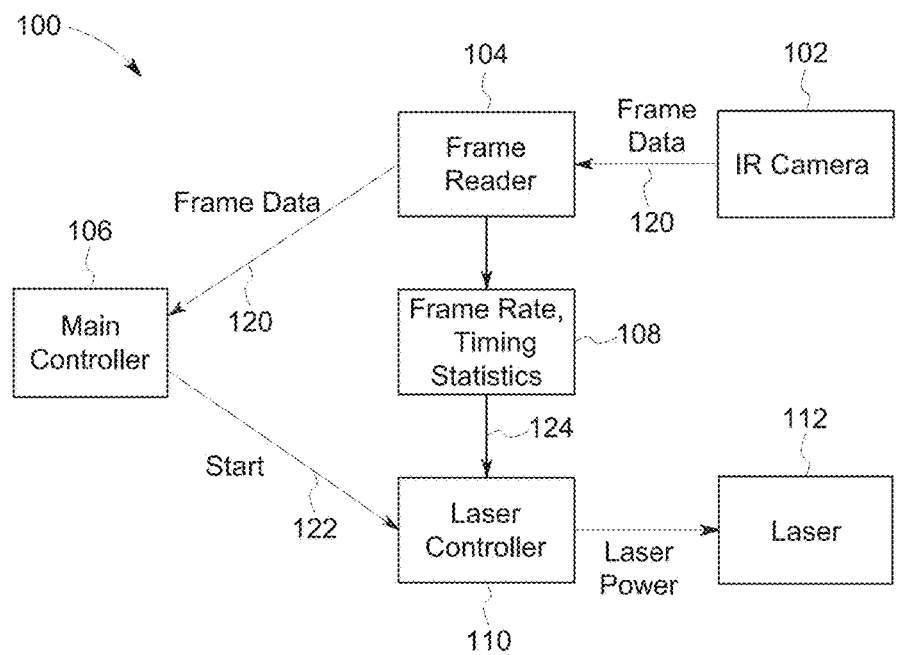
FIG. 1 depicts functional components of a photothermal spectroscopy assay reader, in accordance with aspects of the present disclosure.

One or more specific implementations will be described below. In an effort to provide a concise description of these implementations, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present approach relates to techniques for utilizing infrared (IR)-cameras that lack external control capabilities (e.g., inexpensive and/or consumer-grade IR cameras) in manner that allows precise synchronization with external events (e.g., synchronization within the range of milliseconds or microseconds for certain applications including thermographic applications). By way of example, such approaches may be useful in allowing IR cameras having a frame-rate at or below 9 Hz to be used in the capture of events occurring in the millisecond or microsecond domain.

By way of example, the present approaches may be used in conjunction with a photothermal spectroscopy reader as discussed herein. However it should be appreciated that, though such a spectroscopy reader is discussed herein by way of example, the present approaches may also be useful in other contexts where the use of inexpensive and/or consumer-grade IR cameras may be desirable. Such additional contexts include, but are not limited to, non-destructive testing using an IR or thermal inspection system, which may be used for material inspection and/or defect detection in an industrial or fabrication process.

For the purpose of illustration, however, and to simplify explanation, an implementation based on a photothermal spectroscopy assay reader will be described in greater detail herein. The components of such a reader include: a holder for a diagnostic assay, a laser for irradiating samples during inspection, a system for changing the location of the measurement spot, control electronics incorporating a microprocessor (e.g., a controller) which may used to provide a user interface and/or to execute automated algorithms providing synchronized sampling as discussed herein, and an IR camera. As discussed herein, the IR camera used in the present approach (e.g., in the assay reader in the present example) produces frames at a constant rate but its internal timestamps are not synchronized with any external clock. That is, time stamps generated by the IR camera are generated solely based on a clock or timing function internal to the camera and not validated or synchronized against an external clock or signal. Thus, in conventional approaches, the IR camera cannot be easily or precisely synchronized with an external trigger or event.

By way of example, in the context of a photothermal spectroscopy assay reader, a laser is used to sequentially illuminate a series of spots on a sample so as to heat the sample spots in accordance with an established assay protocol. Thus, in practice, the laser may be directed to a sample for a fixed duration before proceeding to the next spot to be illuminated and so on, potentially returning the laser to illuminate different regions or locations on each sample some set number of times before the assay is completed. The IR camera in turn is used to image the samples before, during or subsequent to laser exposure so as to record the thermal response of the assay material and/or samples.

With this in mind, in practice the laser needs to be fired at a specific time relative to the start of a frame captured by the IR camera but it is not known exactly when the frame is captured, or the time of exposure, due to the unavailability of external synchronization with respect to the operation of the IR camera. Additionally, the delay between the frame capture time (based on the internal timestamp) and the time at which the frame data is read out is typically unknown.

In accordance with the present approach, while the internal timestamp of each frame may be recorded, it is not used in the synchronization calculations. As discussed herein, in order to ensure that the delay between frame capture by the IR camera and frame readout is constant, frames are read as fast as possible in a dedicated loop in a separate processing thread. To achieve synchronization, the reader microprocessor's high resolution clock time is recorded at the exact moment that each frame is read from the IR camera. Based on this data, the external frame rate is calculated. Knowing the frame rate and the frame times allows predicting the time of subsequent frames. Given that, an offset to the predicted external frame time to fire the laser at an arbitrary point within the frame stream can be applied. That is, the timing of laser illumination of a sample (or set of samples) can be controlled based on the timing of frame as determined by the clock run by the microprocessor. In determining the appropriate offset (and thereby the timing of the laser illumination of each sample), a series of values within the frame period can be tested, and the one giving the maximum or optimal output signal can be chosen.

With the preceding in mind, FIG. 1 depicts various aspects of the present approach as a block diagram, with relationships between functional components and data aspects shown by blocks and arrows. Some or all of these functional components may be implemented as hardware (e.g., application specific integrated circuitry) and/or as firmware or software executed on suitable corresponding hardware structures (e.g., general or special purposes processors with associated memory and data storage structures). For example, in one implementation, the described controller (e.g., laser controller 110 and main controller 106) and reader (e.g., frame reader 104) functionalities may be implemented as routines or program modules executing on a microcontroller or other processor special or general-purpose processor elements. However, as noted above, one or more of these functionalities may alternatively be implemented as hardware, depending on the embodiment. Hence, as used herein a frame reader 104, controller 106, and/or laser controller 110 may be understood to refer to either a software implementation or a comparable hardware implementation.

In this example, functional components and data associated with a photothermal spectroscopy assay reader (i.e., assay reader 100) are depicted, including an IR camera 102, a laser 112, and processor-implemented code or routines providing the main controller 106 functionality, frame reader 104 functionality, and laser controller 110 functionality. In one implementation, the routines corresponding to the main controller 106 handle a graphical user interface (GUI) of the assay reader 100 and coordinate test cycles, as discussed in greater detail below. In the depicted example, the controller 106 and IR camera 102 both communicate with the frame reader 104 (e.g., a processor-implemented frame reader module) that continuously reads image frames (e.g., still image or video frames) from the IR camera 102, communicates acquired frames to the controller 106, and, as discussed below, generates and updates timing statistics associated with the frame acquisition and readout process. In addition, the frame reader 104 and controller 106 communicate with a laser controller 110 (e.g., a processor-implemented laser controller module) that controls operation of the laser 112, such as to initiate background capture, laser illumination of a sample, and signal decay during the capture of video frame data.

As discussed herein, the IR camera 102 does not provide synchronization to a clock or signal external to the camera 102. Thus, frames (i.e., frame data 120) generated by the IR camera 102 are initially associated only with a timestamp generated based on internal signal or clock of the IR camera 102, without reference to an external event or trigger. The frame data 120 is read out by a frame reader 104 in communication with the IR camera 102. As noted above, the IR camera 102 and frame reader 104 are operated so as to read frames 120 at a constant rate and, typically as fast as allowed by the hardware and software components. To facilitate synchronization with an external event (here timing of a laser illumination), a high-resolution clock time (generated external to the camera 102, such as a clock routine running on a processor executing the frame reader routine) is recorded by the frame reader 104 at the moment that each frame 120 is read from the camera 102. In one implementation the frame reader routines are executed on a dedicated loop in a separate processing thread in instances where the executing microprocessor of the assay reader 100 has a multi-core microprocessor architecture and is utilized a multi-threaded operating system. In other instances, the frame reader routines may be executed as a single, well-timed loop in a microprocessor context based on a single-core architecture and/or without the benefit of multi-threading.

In the depicted example, the frame reader 104 yields the frame data 120 itself, in the form of acquired infrared image frames, as well as data 108 characterizing the frame acquisition process. By way of example, the data 108 may include a frame rate (i.e., an externally derived frame rate characterizing the rate at which frame acquisition by the IR camera 102 is occurring during a given operation) calculated based on the clock time recorded at the frame reader 104. In addition, the data 108 may include, but is not limited to, timing statistics (e.g., frame acquisition or readout times as determined based on the external high resolution clock functionality) associated with the frame capture and/or readout processes. As will be appreciated, knowing the frame rate and the frame times allows predicting the time of subsequent frames in accordance with the clock functionality. Thus, based on this data 180, in one implementation an offset 124 to the predicted external frame time to fire the laser 112 at an arbitrary point within the frame stream can be applied.

As depicted in FIG. 1, the controller 106 not only receives the frame data 120 (e.g., IR image frames) but also communicates control signals (e.g., start signal 122) to a laser controller 110 (e.g., a laser controller routine or module). In addition, the laser controller 110 receives some or all of the frame characterization data 108, or an offset 124 derived from the data 108 which specifies the time between when a frame is read and the laser activation, which may be used to synchronize the laser activation with the frame acquisitions of the IR camera 102. Based on these inputs and the receipt of a start instruction from the controller 106, the laser controller 110 provides power and activation signals to the laser 112 at timed intervals so as to synchronize an event internal to the IR camera 102 (frame acquisition) and an event external to the IR camera 102 (laser activation and illumination of the samples being assayed by the reader 100) with millisecond precision or better. In particular, the laser controller 110 uses the data 108 (or derived timing offset 124) to ensure that the laser 112 is fired at a specific time relative to the start of a video frame in order to optimize the resulting signal.

Figure 2:
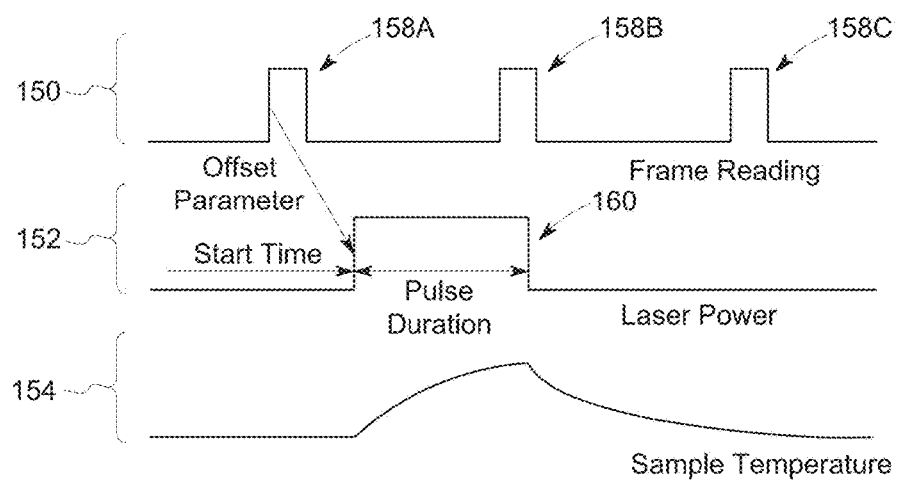
FIG. 2 depicts a timing diagram depicting synchronous sampling in an assay reader context, in accordance with aspects of the present disclosure.

With the preceding generalized discussion in mind, FIG. 2 depicts a timing diagram depicting synchronous sampling in an assay reader context in accordance with the present approach. In particular, the timing diagram of FIG. 2, depicts a timing line 150 showing frame readout activity, a laser power line 152 showing laser on and off (i.e., power) activity, and a sample temperature line 154 showing temperature of a respective assayed sample in response to laser illumination. As shown, frames are acquired (peaks 158) at regular intervals (e.g., with a 116 ms period) based on the operation of the IR camera 102, which is not synced to external events. Based on the known frame rate and timing shown along line 150, initiation and duration of laser activation, shown by peak 160, is timed (based on a calculated offset parameter 124 (FIG. 1)) so that a frame is acquired (peak 158B) in synchrony with the sample being illuminated by the laser for the calculated pulse duration. In practice, the photothermal spectroscopy signal in an assay context may be maximized or optimized when the laser pulse 160 is overlapped with the camera frame, here frame 158B.

The significance of this frame acquisition timing and laser activation and duration can be seen in sample temperature time line 154, where it can be seen that the frame acquisition 158B corresponds to the time interval at which the sample has been heated by the laser and is thus ready to be imaged. Thus, as shown by the respective timelines of FIG. 2, the imaging characteristics of the IR camera 102 can be effectively synchronized with an external event, here the laser irradiation of the sample, despite having no intrinsic ability to communicate with an external clock or device. In particular, the offset used to synchronize frame acquisition and laser activation may be determined, as shown with reference to sample temperature timeline 154 and frame readout timeline 150, so as to maximize or optimize useful signal intensity derived from the sample being laser illuminated.

It may also be noted that the first frame depicted, corresponding to readout operation 158A, may be used as a background or subtraction image in certain implementations. For example, as can be seen by both frame acquisition timeline 150 and sample temperature timeline 154, the frame acquired at readout operation 158A is acquired prior to heating of the sample by the laser, and thus corresponds to a baseline or background temperature. Hence, a frame acquired at readout operation 158A may subsequently be used as a background image that is subtracted from the signal frame acquired at readout operation 158B to generate a signal only image free of background characteristics present in both frames.

With the preceding in mind, implementation aspects of one instance of a photothermal spectroscopy assay operation performed in accordance with the present approach will be provided by way of example. In this example, laser pulse timing is configured to match the integer of the camera frame periods (e.g., a pulse period of 0.581 sec=5 camera frames). For a given test medium to be assayed, which may contain multiple lines of nanoparticles or other test media to be assayed, a nested sampling approach may be employed consisting of macro-steps that are alternately read using a series of offset micro-steps. A used herein, the term macro-steps refers to dividing the sample length-wise into a number of zones, and enabling the laser beam to step through those zones for measurements. Macro-stepping may be used to decrease the cool-off time between consecutive pulses by providing separation between sequential pulses. The term micro-stepping refers to the ability of the system to guide the laser beam in small steps (e.g. 130 µm) through each of the zones. The order in which the zones are interrogated is optimized based on the thermal response of the sample. The purpose of the described stepping method is to obtain a plot of the photothermal response with a defined resolution.

By way of example, a given test medium may contain a series of macro-step positions (A, B, C, and so forth) separated by a given macro-step spacing (e.g., 2.6 mm). Each macro-step may be alternately read using a sequence of laser illumination spots that traverse the macro-step in smaller increments (e.g., micro-steps). By way of example, in this instance each micro-step may be 0.13 mm such that the 2.6 mm macro-steps correspond to twenty micro-steps. Thus in this example, a first spot (1) at macro-step A may be initially sampled (i.e., spot A1), followed by the first spot (1) at macro-step B (i.e., spot B1) and so forth, until the last macro-step is sampled at the first spot and the cycle is reset to the second spot (2) at macro-step A (i.e., spot A2). Thus, a sample sequence may be A1, B1, C1, D1, . . . , A2, B2, C2, D2, and so forth until sampling is completed. In this example, the macro-step distance (here 2.6 mm) represents the distance between consecutive laser pulses while the micro-step distance (here 0.13 mm) represents the spatial resolution of the line profile.

Figure 3:
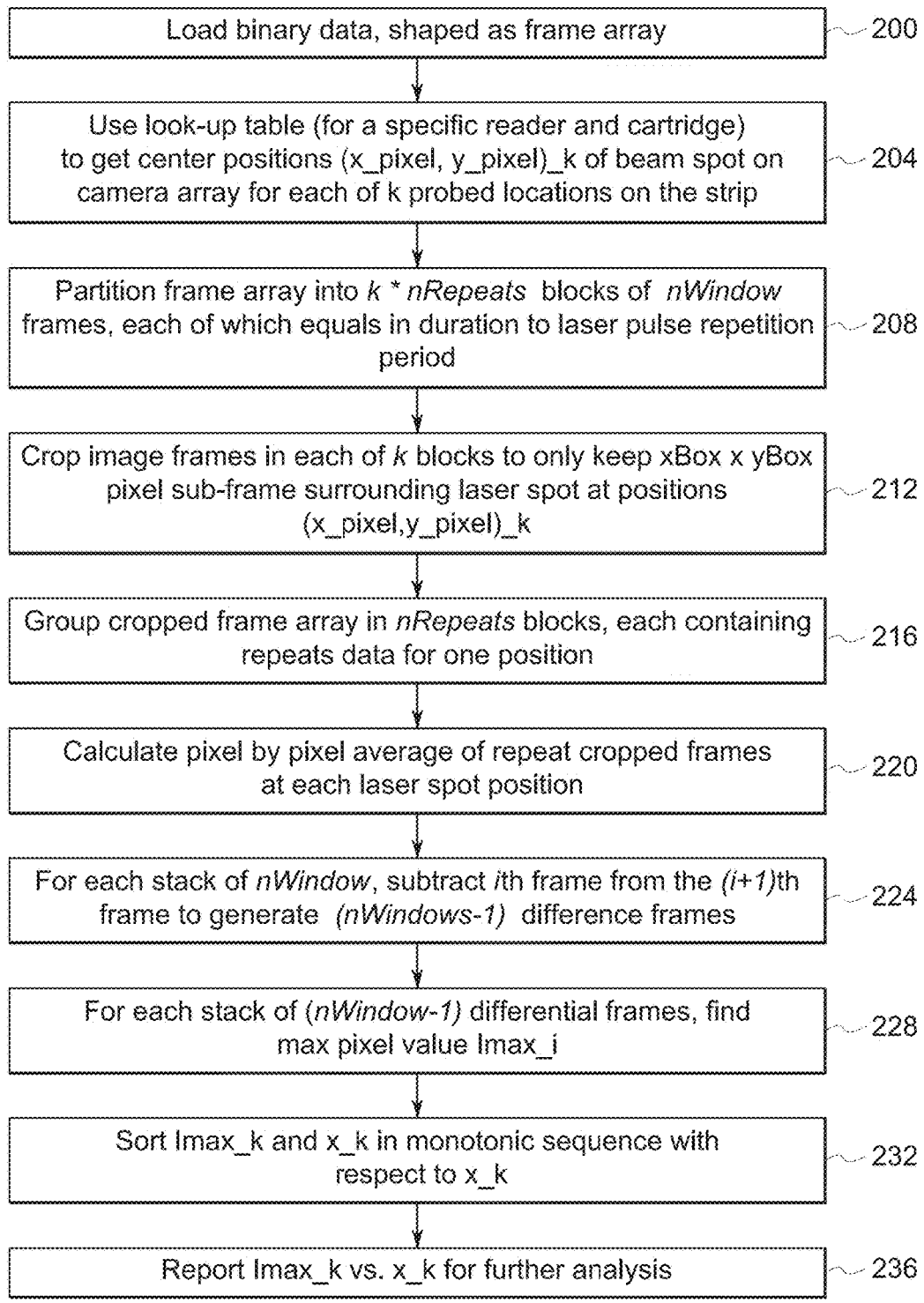
FIG. 3 depicts an example of data analysis process flow for synchronous sampling, in accordance with aspects of the present disclosure.

With the preceding in mind, FIG. 3 depicts an example of data analysis process flow steps, including some pseudocode elements, associated with one implementation of the present approach. In this example of a process flow, various related steps or functions may be performed by the frame reader 104, controller 106, and/or laser controller 110, as appropriate. Turning to FIG. 3, at step 200, binary data corresponding to outputs of the camera 102 are loaded and broken into or shaped as a frame array. Redundant frames, if present, may be dropped so that only unique frames are retained. A lookup table (specific to a given assay reader and sample cartridge setup) is accessed (step 204) and used to obtain center positions (e.g. as characterized by $(x^{pixel}, y^{pixel})^k$) of the laser beam spot on the camera array for each of k probed locations on a given assay strip. The frame array is then partitioned (step 208) into k*nRepeats blocks or nWindow frames, each of which equals or corresponds to the laser pulse repetition period. Image frames are cropped (step 212) in each of k blocks to only retain $x^{Box} \times y^{Box}$ pixels sub-frames surrounding the laser spot positions $(x^{pixel}, y^{pixel})^k$. That is, at step 212, image data is cropped to only retain or process that data determined to be relevant to the assay reading operation, such as a block of data (e.g. 0.7×0.7 or 1×1 mm) that is large enough to capture heating in the probed macro-step region, and small enough to avoid adjacent macro-step regions. The cropped frame array is grouped (step 216) in nRepeat blocks, each containing repeat data for one position. A pixel by pixel average is calculated (step 220) of repeat cropped frames at each laser position. At step 224, at each stack of nWindow, the ith frame is subtracted from the (i+1)th frame to generate (nWindows−1) differential frames. That is, at this step the background or baseline image (i.e., the preceding frame) is subtracted to generate a difference image depicting useful signal. For each stack of (nWindow−1) differential frames, the maximum pixel value (i.e., intensity) $Imax^i$ is found (step 228). Alternatively, the maximum value from an averaged of some set of frames may be determined. $Imax^k$ and $x^k$ are sorted in monotonic sequence (step 232) with respect to $x^k$. In the final depicted step (step 236) $Imax^k$ versus $x^k$ are output for further analysis.

Figure 4:
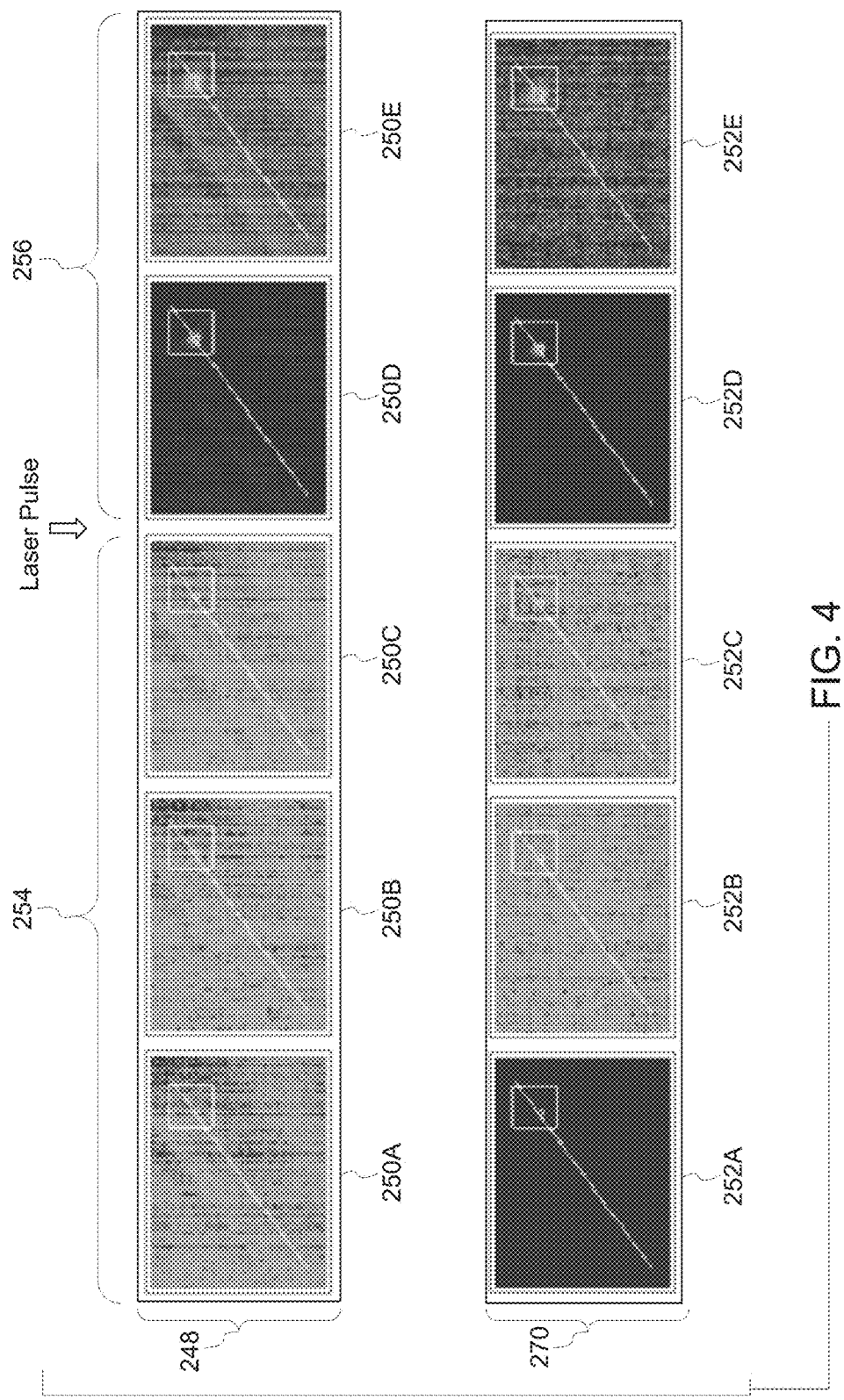
FIG. 4 depicts examples of measured image frames acquired using synchronization as described herein, and corresponding differential images, in accordance with aspects of the present disclosure.

Turning to FIG. 4, an example of image frames acquired and processed in accordance with the described approach are provided by way of example. The top row of frames depicts an array 248 of images 250, arranged in acquisition order, each depicting the signal as measured for each frame. The first three frames 254 in the array 248 (i.e., frames 250A, 250B, and 250C) are acquired prior to illumination by laser pulse 260 and thus correspond to "dark" or background images. The last two frames 256 (i.e., frames 250D and 250E) in the sequence are acquired during or immediately after laser pulse 260 and thus correspond to photothermal response or decay images.

The bottom row of frames depicts an array 270 corresponding to the differential images 252 obtained by subtracting, on a pixel-by-pixel basis, the initial background image 250A (i.e., the first frame in the series) from the corresponding frame. Thus, frame 252A corresponds to the differential image obtained by subtracting frame 250A from itself, frame 252B corresponds to the differential image obtained by subtracting initial frame 250A from subsequent frame 250B, and so forth. The differential images 252, such as the differential thermal response images 252D and/or differential decay image 252E may be of particular interest in an assay context as they show signal generated in response to laser heating with background effects removed.

In terms of signal quality of the photothermal spectroscopic response, the approach described herein offers certain demonstrable benefits over non-synchronized approaches. For example, in FIG. 5 two sets of photothermal spectroscopic responses over time are depicted. Data was generated using a "dummy" cartridge having a uniformly absorbing surface (e.g., a black aluminum surface) that provided a uniform heating response over the entire surface when scanned.

The top graph depicts measured photothermal spectroscopic response over time when the laser pulse rate and the frame acquisition rate of the camera are not synchronized. As seen in the top graph of FIG. 5, there is an observable "frame slip" effect due to the mismatch between laser pulse rate and frame rate. This mismatch between the laser activation and camera acquisition frequencies leads to a lack of synchrony in the observed photothermal spectroscopic response, which is manifested in the generally wave-like pattern observed in the responses over time. That is, there are observable peaks and valleys in observed response over time as the mismatch between laser activation and camera frame acquisition varies is degree over time.

Figure 5:
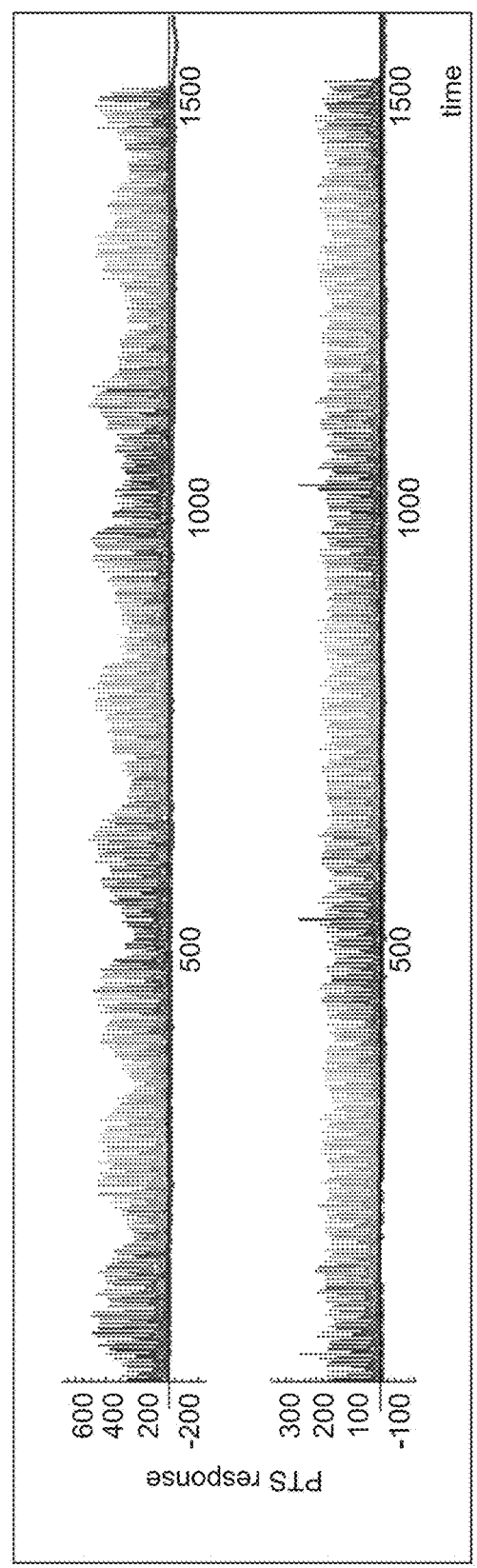
FIG. 5 depicts graphs showing spectroscopic responses in both unsynchronized and synchronized contexts, in accordance with aspects of the present disclosure.

Conversely, as shown in the bottom graph of FIG. 5, when the activation of the laser is matched or synchronized to the constant frame rate acquisition of the IR camera, as described herein, the observed photothermal spectroscopic response is substantially more uniform (i.e., flatter in the context of the depicted graph), with substantially less mismatch between the frame acquisition and laser activation. Such uniformity is indicative of improved synchronization of the laser pulse activation relative to the camera frame acquisitions. As will be appreciated, the use of response graphs as those depicted in FIG. 5 may be useful for detecting synchronization slippage or deviation in the context of the present approach based upon the presence or degree of observed "peaks" and "valleys" in the response data over time.

Technical effects of the invention include synchronization of frame acquisition by a camera with an external event or trigger when the camera lacks external control capabilities. For example, inexpensive and/or consumer grade cameras typically lack a control interface to explicitly synchronize with an external trigger event or external device. The present approach allows synchronization of such a camera lacking external synchronization capabilities with an external event or device. The present synchronization approach may facilitate the use of inexpensive or consumer-grade IR cameras in a spectroscopic reader context where synchronization with an external sample excitation source is desirable.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of synchronizing image frame acquisition with an external circuit in an assay reader or non-destructive testing system, comprising:

acquiring image frames of one or more samples at a constant frame rate using an infrared (IR) camera, wherein the IR camera is not configured to acquire image frames in response to activation of an external circuit;

estimating the constant frame rate and acquisition time of more than one acquired image frame using a signal comprising the image frames from the IR camera;

based on the estimated constant frame rate and the acquisition times, predicting a timing offset between the timing of future frame acquisitions and the activation of the external circuit, wherein the timing offset is based on obtaining a maximum or optimal output signal in a respective frame; and activating the external circuit based at least in part on the predicted timing offset.

2. The method of claim 1, wherein the step of acquiring image frames generated by the IR camera is performed in a dedicated loop of a processing thread.

3. The method of claim 1, wherein the clock external to the IR camera comprises a clock routine executing on a frame reader configured to perform the step of acquiring the image frames.

4. The method of claim 1, wherein the timing offset synchronizes activation of the external circuit with the respective frame acquisition such that the respective frame acquisition occurs during activation of the external circuit or immediately following activation of the external circuit.

5. The method of claim 1, wherein activating the external circuit comprises activating a laser to emit a laser pulse.

6. The method of claim 1, the step of activating the external circuit is synchronized with a respective frame acquisition.

7. An image acquisition system comprising one of an assay reader or non-destructive testing system, the image acquisition system, comprising:
    an infrared (IR) camera, wherein the IR camera is configured to acquire image frames of one or more samples at a constant frame rate;
    a frame reader configured to acquire the image frames from the IR camera and to use timing of the image frames to estimate the constant frame rate and acquisition time of more than one acquired image frame; and
    an external circuit configured to be activated based at least in part on a timing offset that is predicted based on the estimated constant frame rate and the acquisition times, wherein the timing offset corresponds to an offset between the timing of future frame acquisitions and the activation of the external circuit and is based on obtaining a maximum or optimal output signal in a respective frame.

8. The image acquisition system of claim 7, further comprising a microprocessor-based controller configured to acquire image frames from the frame reader and to provide control signals to the external circuit.

9. The image acquisition system of claim 7, wherein the frame reader is implemented as a dedicated loop of a processing thread.

10. The image acquisition system of claim 7, wherein the external circuit is a laser.

11. The image acquisition system of claim 10, further comprising a laser controller configured to generate control signals for the laser based at least in part on timing of future frame acquisitions.

12. The image acquisition system of claim 7, wherein the IR camera is not configured to acquire frames in response to activation of the external circuit.

13. The image acquisition system of claim 7, wherein the clock external to the IR camera comprises a clock routine executing on the frame reader or on a processor-based controller in communication with the frame reader.

14. The image acquisition system of claim 7, the external circuit is activated based on a timing offset determined based upon the timing of future frame acquisitions and calculated so as to maximize the output signal in a respective frame when the external circuit is activated using the timing offset.

15. A method of performing a photothermal spectroscopy assay, comprising:
    acquiring image frames of one or more samples at a constant frame rate using an infrared (IR) camera, wherein the IR camera is not configured to acquire image frames in response to activation of a laser used to illuminate the samples;
    estimating the constant frame rate and acquisition time of more than one acquired image frame using a signal comprising the image frames from the IR camera;
    based on the estimated constant frame rate and the acquisition times, predicting a timing offset between the timing of future frame acquisitions and the activation of the laser, wherein the timing offset is based on obtaining a maximum or optimal output signal in a respective frame; and
    activating the laser based at least in part on the predicted timing offset.

16. The method of claim 15, wherein the clock external to the IR camera comprises a clock routine executing on a frame reader configured to perform the step of acquiring the image frames.

17. The method of claim 15, wherein the timing offset synchronizes activation of the laser with the respective frame acquisition such that the respective frame acquisition occurs during activation of the laser or immediately following activation of the laser.

* * * * *